(12) United States Patent
Zhang et al.

(10) Patent No.: US 12,450,567 B2
(45) Date of Patent: Oct. 21, 2025

(54) INTERACTION METHOD AND APPARATUS, AND ELECTRONIC DEVICE

(71) Applicant: BEIJING ZITIAO NETWORK TECHNOLOGY CO., LTD., Beijing (CN)

(72) Inventors: Xiaoping Zhang, Beijing (CN); Yunsheng Hao, Beijing (CN); Jialu Wang, Beijing (CN); Yi Wei, Beijing (CN); Pengzhan Xu, Beijing (CN); Guichao Ren, Beijing (CN); Boyu Zhou, Beijing (CN); Zitian Guo, Beijing (CN); Yuxiang Li, Beijing (CN); Jieli Liang, Beijing (CN); Xiaofei Gao, Beijing (CN); Daozhi Lin, Beijing (CN); Hong Zou, Beijing (CN); Wentao Liu, Beijing (CN); Zheng Chen, Beijing (CN); Shanshan Ling, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/392,477

(22) Filed: Dec. 21, 2023

(65) Prior Publication Data

US 2024/0127186 A1 Apr. 18, 2024

Related U.S. Application Data

(63) Continuation of application No. PCT/CN2022/117519, filed on Sep. 7, 2022.

(30) Foreign Application Priority Data

Sep. 7, 2021 (CN) .......................... 202111046967.X

(51) Int. Cl.
*G06Q 10/105* (2023.01)
(52) U.S. Cl.
CPC .................................. *G06Q 10/105* (2013.01)
(58) Field of Classification Search
CPC ..................................................... G06Q 10/105
See application file for complete search history.

(56) References Cited

U.S. PATENT DOCUMENTS 11,153,293 B1* 10/2021 Fan ........................ H04L 63/101
2015/0350103 A1* 12/2015 Bertram .............. H04L 41/5054
709/226

(Continued)

FOREIGN PATENT DOCUMENTS

| CN | 108965109 A | 12/2018 |
| CN | 109088812 A | 12/2018 |

(Continued)

OTHER PUBLICATIONS

Morgado, Carmen, et al. "A group-based model for dynamic communities." 2009 International Conference on Computational Aspects of Social Networks. IEEE, 2009. (Year: 2009).*

(Continued)

*Primary Examiner* — Corey Russ
(74) *Attorney, Agent, or Firm* — Astute IP Law Group

(57) ABSTRACT

An interaction method and apparatus and an electronic device. The method comprises: displaying a first application interface, wherein the first application interface comprises an interface of a first application; and creating a second application account in the first application interface, wherein the second application account is used for logging in a second application. Therefore, a new interaction mode is provided.

19 Claims, 8 Drawing Sheets

(56) References Cited

U.S. PATENT DOCUMENTS

| | | | |
|---|---|---|---|
| 2015/0370905 A1 | 12/2015 | Leon et al. | |
| 2019/0324824 A1* | 10/2019 | Aggarwal | G06F 9/541 |
| 2020/0304440 A1* | 9/2020 | Chen | G06F 21/60 |
| 2020/0328906 A1* | 10/2020 | Raghavan | G06F 21/62 |
| 2021/0014214 A1* | 1/2021 | Ford | H04L 63/0428 |
| 2021/0081947 A1* | 3/2021 | Hockey | H04L 63/0838 |
| 2021/0105280 A1* | 4/2021 | Lansing | G06F 16/93 |
| 2022/0103565 A1* | 3/2022 | Gilbert | G06Q 10/063118 |
| 2022/0321658 A1* | 10/2022 | Goodman | H04L 67/306 |
| 2023/0125139 A1* | 4/2023 | Luo | H04L 9/3247 |
| | | | 726/4 |

FOREIGN PATENT DOCUMENTS

| | | |
|---|---|---|
| CN | 109167717 A | 1/2019 |
| CN | 109167755 A | 1/2019 |
| WO | 2017028649 A1 | 2/2017 |

OTHER PUBLICATIONS

Liu, Wenyin, et al. "LoginSoEasy: a System Enabling both Authentication and Protection of Personal Information based on Trusted User Agent." 2021 IEEE Sixth International Conference on Data Science in Cyberspace (DSC). IEEE, 2021. (Year: 2021).*
International Search Report (with English translation) and Written Opinion issued in PCT/CN2022/117519, dated Dec. 1, 2022, 9 pages provided.

* cited by examiner

INTERACTION METHOD AND APPARATUS, AND ELECTRONIC DEVICE

CROSS-REFERENCE TO RELATED APPLICATION(S)

This application is a Continuation application of International Patent Application No. PCT/CN2022/117519, filed on Sep. 7, 2022, which claims the priority of Chinese Patent Application No. "202111046967.X", filed on Sep. 7, 2021 and entitled "INTERACTION METHOD AND APPARATUS, AND ELECTRONIC DEVICE", which are incorporated in its entirety herein by reference.

FIELD

The disclosure relates to the field of computer technology, and in particular to an interaction method and apparatus, and an electronic device.

BACKGROUND

With the development of computers, users can utilize electronic devices to realize various functions. For example, the users can use the electronic devices for online office work or for watching various videos.

In some scenarios, video-based applications, as content platforms, can provide various contents for a large number of users.

SUMMARY

This disclosure content section is provided to briefly introduce concepts, and these concepts will be described in detail in following specific implementations. This disclosure content section is not intended to identify the key or necessary features of the technical solutions claimed for protection, nor is it intended to be used to limit the scope of the technical solutions claimed for protection.

In a first aspect, an embodiment of the disclosure provides an interaction method. The method includes: displaying a first application interface, where the first application interface includes an interface of a first application; and creating a second application account in the first application interface, where the second application account is configured to log in a second application.

In a second aspect, an embodiment of the disclosure provides an interaction method. The method includes: configuring permissions of a second team member of a target second application team in a first application interface, where a target first application team associated with the first application interface is bound with the target second application team.

In a third aspect, an embodiment of the disclosure provides an interaction apparatus, including: a display unit, configured to display a first application interface, where the first application interface includes an interface of a first application; and a creation unit, configured to create a second application account in the first application interface, where the second application account is configured to log in a second application.

In a fourth aspect, an embodiment of the disclosure provides an interaction apparatus, including: a configuration unit, configured to configure permissions of a second team member of a target second application team in a first application interface, where a target first application team associated with the first application interface is bound with the target second application team.

In a fifth aspect, an embodiment of the disclosure provides an electronic device, including: one or more processors; and a storage configured to store one or more programs, when executed by the one or more processors, cause the one or more processors to implement the interaction method in the first aspect or the second aspect.

In a sixth aspect, an embodiment of the disclosure provides a computer-readable medium storing a computer program, when executed by a processor, implements the steps of the interaction method in the first aspect or the second aspect.

BRIEF DESCRIPTION OF THE DRAWINGS

The above and other features, advantages, and aspects of various embodiments of the disclosure will become more apparent in conjunction with the accompanying drawings and with reference to following specific implementations. In the accompanying drawings, same or similar reference numerals denote same or similar elements. It should be understood that the accompanying drawings are illustrative, and components and elements may not necessarily be drawn to scale.

DETAILED DESCRIPTION OF EMBODIMENTS

The embodiments of the disclosure will be described in more detail below with reference to the accompanying drawings. Although the accompanying drawings show some embodiments of the disclosure, it should be understood that the disclosure may be implemented in various forms, and should not be construed as being limited to the embodiments stated herein. On the contrary, these embodiments are provided for a more thorough and complete understanding of the disclosure. It should be understood that the accompanying drawings and the embodiments of the disclosure are for exemplary purposes only, and are not intended to limit the scope of protection of the disclosure.

It should be understood that the steps recorded in the method implementations in the disclosure may be performed in different orders and/or in parallel. In addition, the method embodiments may include additional steps and/or omit steps shown during execution. The scope of the disclosure is not limited in this aspect.

The term "including" and variations thereof used in this specification are open-ended, namely "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". The related definitions of other terms will be provided in the subsequent description.

It should be noted that "first," "second," and other concepts mentioned in the disclosure are only for distinguishing different apparatuses, modules, or units, and are not intended to limit the order or relation of interdependence of functions performed by these apparatuses, modules, or units.

It should be noted that modifiers such as "a" and "a plurality of" mentioned in the disclosure are indicative rather than limiting, and those skilled in the art should understand that unless otherwise explicitly specified in the context, it should be interpreted as "one or more".

The names of messages or information exchanged between multiple apparatuses in the implementations of the disclosure are provided for illustrative purposes only, and are not intended to limit the scope of these messages or information.

Figure 1:
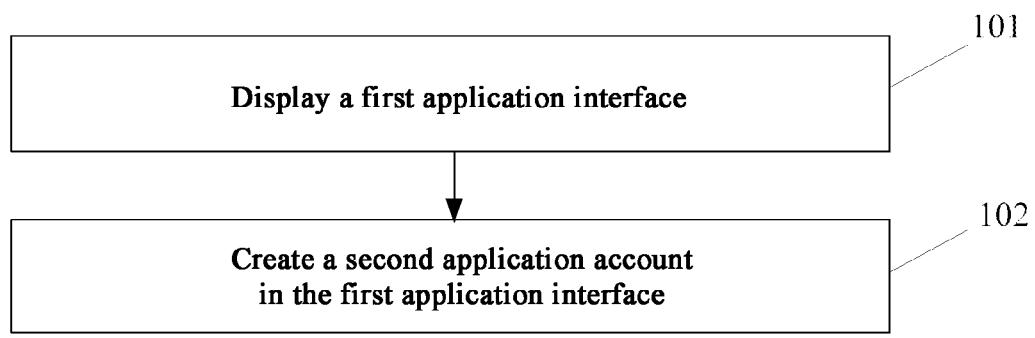
FIG. 1 is a flowchart of an embodiment of an interaction method according to the disclosure.

Referring to FIG. 1, FIG. 1 illustrates a flow of an embodiment of an interaction method according to the disclosure. The interaction method shown in FIG. 1 includes the following steps:

Step 101: a first application interface is displayed.

In this embodiment, an executive body of the interaction method (e.g., a server and/or a terminal device) may display the first application interface.

Herein, the first application interface may include any interface of a first application.

Step 102: a second application account is created in the first application interface.

Herein, the second application account is configured to log into a second application.

It should be understood that the specific types of the first application and the second application may be set according to practical application scenarios and are not limited herein. As an example, the first application may include an office application, and the second application may be a video playback application. As an example, an account for the video playback application may be created within the office application.

It should be noted that the creation and subsequent management of the second application account are initiated by a user within the first application.

It should be noted that according to the interaction method provided in this embodiment, by creating the second application account in the first application, a new way for creating the second application account can be provided. In addition, if the user needs to create the second application account while using the first application, there is no need to switch to the second application to perform the account creation operation, thereby improving the operation efficiency of the user. Further, if the user needs to create a plurality of second application accounts, batched creation of the second application accounts can be implemented in the first application interface, thereby further improving the operation efficiency of the user in creating the accounts used in the second application.

By comparison, in some related arts, a technical path where accounts of two applications can exchange messages may be adopted to realize communication between the two applications. However, in the related arts, the two accounts that can exchange messages are both independently created within respective applications. The account of each application is kept independent in the application, which cannot be subjected to operations such as creation or management by other applications unless the application.

In some embodiments, the method further includes: the created second application account is bound with a team member in a target first application team.

Herein, the target first application team is a team in a first application account system, and teams in the first application account system include team members.

As an example, the first application account system may include a plurality of teams, such as a team A and a team B. The team A may include members Xiao Wang and Xiao Zhang. The team B may include members Xiao Li and Xiao Liu.

As an example, the created second application account (e.g., the account name is A company receptionist) may be bound with Xiao Wang in the team A.

It should be understood that when the second application account is created in the first application interface, a creator who performs the creating operation may be a user with operational permissions (e.g., an administrator) within a certain team.

In some embodiments, the binding the created second application account with a team member in a target first application team includes: a team member is selected from team members of the target first application team as a target team member; and the created second application account is bound with the target team member.

Herein, after the second application account is created, the team member may be selected from the first application team and be bound with the second application account. As an example, after the second application account is created, Xiao Wang may be selected from the team A as the target team member to bind with the created second application account "A company receptionist".

In some embodiments, the method further includes: the team member in the target first application team and the second application account are unbound.

Herein, the team members and the second application account may also be unbound. As an example, Xiao Wang in the team A and the created second application account "A company receptionist" may be unbound.

In some embodiments, unbinding between the team members and the second application account may be operated by an administrator (e.g., an administrator in the team A) of the first application team, and may also be operated by a team A member (e.g., Xiao Wang in the team B) bound by the second application.

In some embodiments, the method further includes: the second application account and the bound team member are unbound in response to unbinding between the team member bound by the second application account and the target first application team; and a prompt message is displayed, where the prompt message is configured to prompt binding a new team member for the second application account.

When the team member and the first application team are unbound, the second application account bound with the team member may be automatically unbound from the first application team. Then, the prompt message may be displayed so as to prompt the user about re-binding a team member from the first application team to the second application account.

As an example, Xiao Wang in the team A in the first application has a binding relationship with the A company receptionist in the second application. If Xiao Wang from the first team A is unbound from the team A (e.g., Xiao Wang resigns from the team A), the binding relationship between the A company receptionist and Xiao Wang can be released. In this case, it should be understood that the A company receptionist in the second application is unbound from a member in the team A, but still maintains a binding relationship with the team A, the A company receptionist in the second application may be bound with a new member in the team A.

It should be noted that by binding the second application account with the team members of the first application team, the second application account may serve as a shell to realize, through the binding relationship which is a variable relationship, a flexible binding relationship between the second application account and members from different first application teams, such that the second application account is reused by the different team A members. Generally, the second application account can accumulate a large number of users and resources. If the user of the second application account leaves the first application team, the second application account can be transferred (rebound) to another member of the first application team, thereby inheriting the users and resources of the second application account.

In some embodiments, the method further includes: management operations are performed on the created second application account in the first application interface, where the management operations include at least one of the following: viewing, searching, and filtering.

In some embodiments, the created second application account is bound with a target second application team.

Herein, the target second application team is a team in a second application account system, and teams in the second application account system include team members.

As an example, the created second application account being A company receptionist is bound with an A company of the target second application team.

It should be noted that the second application account is bound with the target second application team, which can provide a basis for managing the second application account, so as to manage, with the second application team as a unit, accounts under various second application teams.

In some embodiments, step S102 may include: a target second application team bound with the target first application team is determined, where the target first application team is associated with the first application interface; and a second application account belonging to the target second application team is created in the first application interface.

Herein, the target first application team may be bound with at least one team in the second application. For example, a first company in the first application may be bound with the A company in the second application.

The second application account belonging to the target second application team may be created in the first application interface of the target first application team. As an example, if the first application interface belongs to the first company of the first application team, the second application account created in the first application interface can automatically be bound with the A company of the second application team bound by the first company. That is, in the application interface of the first company, the second application account (e.g., the A company receptionist) is automatically created for the A company.

It should be noted that the second application account is created in the first application interface of the first application team, and the created second application account is automatically bound with the second application team bound by the first application team. Therefore, member accounts can be automatically created for the second application team in the first application interface, thereby reducing operations and shortening the time in manual binding by users.

In some embodiments, before determining the target second application team bound with the target first application team, the method further includes: a second application team identification input by a user is received in the first application interface; a first binding request is sent according to the second application team identification; and based on a verification result on the first binding request, whether to bind the target first application team associated with the first application interface with the second application team indicated by the second application team identification input by the user is determined.

Herein, the first binding request is configured to request the binding between the target first application team and the second application team indicated by the second application team identification input by the user.

As an example, the target first application team may be the team A, and the user may input the second application team identification (e.g., "company B") in the first application interface of the team A. The first binding request can be sent according to the second application team identification (e.g., "company B"). The first binding request may be configured to request the binding between the team A and the company indicated by "company B". Based on the verification result on the first binding request, whether the team A is bound with the company indicated by "company B" can be determined.

Herein, the verification method for the first binding request may be set according to practical application scenarios, which is not limited herein.

As an example, the verification method can involve verification in multiple aspects, such as whether the team A and the company indicated by the "company B" are the same entity, or whether an administrator of the "company B" in the second application agrees to the binding.

It should be noted that a first team in the first application is established so as to be bound with at least one second application team in the second application. Accordingly, the second application team can be managed based on the first application team, thereby improving the efficiency of managing the team members of the second application team.

In some embodiments, the verification step of verifying the first binding request includes: whether an entity corresponding to the target first application team is the same with an entity corresponding to the second application team identification input by the user is verified; if they are the same, a binding confirmation notification is sent to an administrative user corresponding to the second application team identification in the second application; and based on the confirmation operation of the binding confirmation notification, it is confirmed that the verification of the first binding request is successful.

Herein, the entity may be understood as an entity in legal sense. For example, the entity may include a natural person, a legal person, a non-legal person organization, etc.

Figure 4:
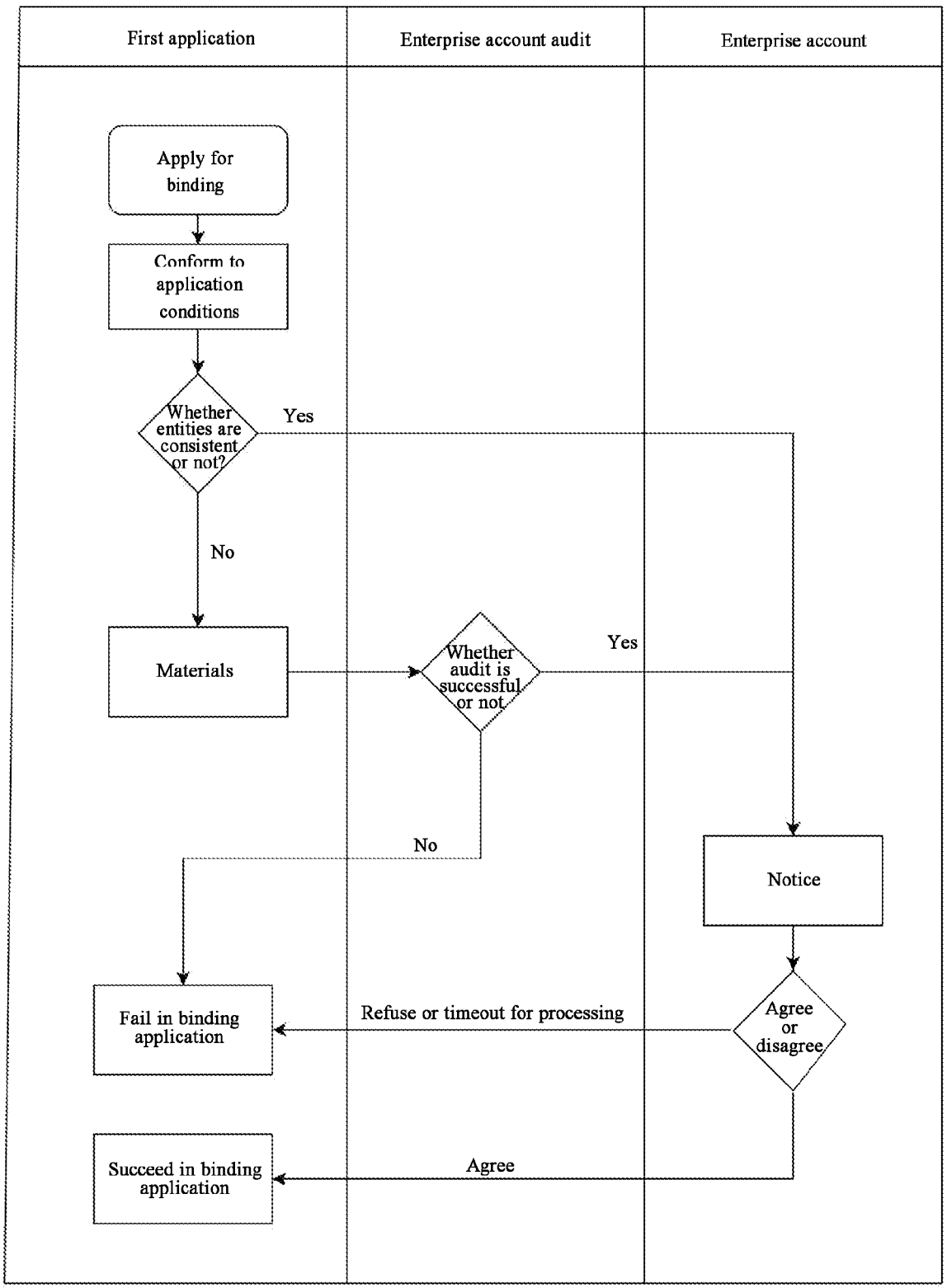
FIG. 4 is a schematic diagram of an application scenario of an interaction method according to the disclosure.

Herein, referring to FIG. 4, FIG. 4 illustrates a process of verifying a first binding request.

It should be noted that verification on the first binding request may include verification of whether entities are the same. After verifying that the entities are the same, whether binding is performed may be confirmed by the administrative user of the second application team. Therefore, accounts of the same entity across different platforms can be bound, thereby facilitating management by the same entity. In addition, after the team administrative user of the second application team confirms the binding, a human user can further determine that the binding implemented currently is accurate, thereby ensuring the accuracy of the binding.

In some embodiments, the method further includes: a first application team identification input by a user is received in a second application interface; a second binding request is sent according to the first application team identification, where the second binding request is configured to request the binding between a target second application team and a first application team indicated by the first application team identification input by the user; and based on a verification result on the second binding request, whether to bind the target second application team associated with the second application interface with the first application team indicated by the first application team identification input by the user is determined.

In some embodiments, the method further includes: in response to a second application account is bound with a first application account logging in the first application currently, displaying a login entry for the second application in the first application; and displaying a second application interface based on using the second application account at the login entry that bound with the first application account currently logged.

Figure 5:
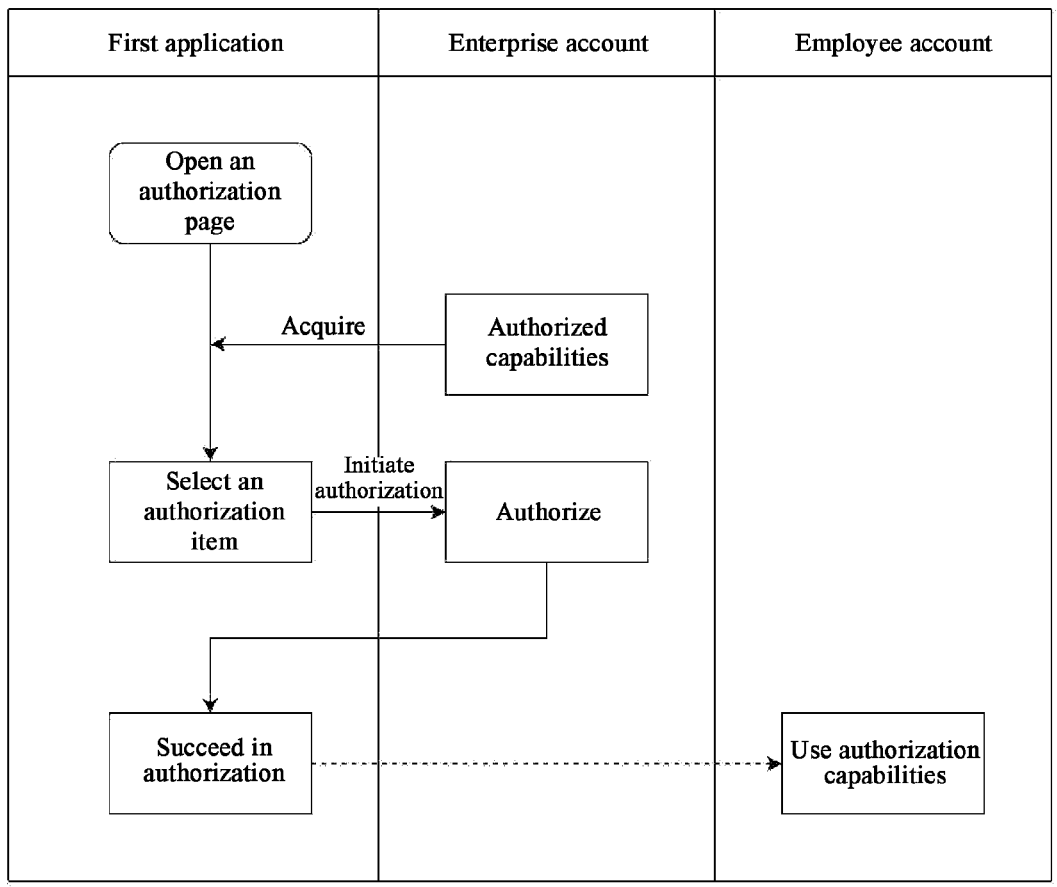
FIG. 5 is a schematic diagram of an application scenario of an interaction method according to the disclosure.

Referring to FIG. 5, FIG. 5 illustrates a flow of an embodiment of an interaction method according to the disclosure. The interaction method shown in FIG. 5 includes the following steps:

Step 501: permissions of a second team member of a target second application team are configured in a first application interface.

Herein, a target first application team associated with the first application interface is bound with the target second application team.

Herein, the second application team may be referred to as an enterprise account, and the second team member may be referred to as an employee account or staff account.

The second application team may have some functional tools. The second team member belonging to the second application team may have permissions to use some or all of the functional tools of the team.

The type of the functional tools may be set according to practical application scenarios, which is not limited herein. As an example, the functional tools for the second team member may include but not limited to at least one of the following: a marketing tool (e.g., a shopping cart, and a lead generation component).

It should be noted that by configuring the permissions of the second team member (i.e., the second application account) in the first application interface, the permissions of the second application account can be managed in the first application interface, thereby realizing rapid management on the second application account. In the process of using the first application by the user, if the user needs to perform permission operations on the second application account in the second application, there is no need to navigate to the second application for the operations.

In some embodiments, an entry for configuring the permissions of the second application account may be only set in the first application. Therefore, the permissions for managing the second application account may be consolidated within the first application, thereby solving the problems such as abuse of permissions in the second application account.

In some embodiments, the step of configuring the permissions of the second team member of the target second application team in the first application interface includes: a preset first permission identification of the target second application team is displayed in the first application interface, and the preset first permission identification indicates team permissions possessed by second application teams; according to the selection operation on the displayed preset first permission identification, a first authorization request is sent according to the selected first permission identification; and based on an authorization result for the first authorization request, a preset first permission possessed by the second team member is determined.

The second application team may have some functional tools. The second team member belonging to the second application team may have permissions to use some or all of the functional tools of the team.

The type of the functional tools may be set according to practical application scenarios, which is not limited herein.

As an example, the functional tools for the second team member may include but not limited to at least one of the following: a marketing tool (e.g., a shopping cart, and a lead generation component).

Accordingly, the second team member can inherit some team permissions of the second team so as to perform some activities, such as explanations on enterprise businesses within the public domain flow range. Therefore, the efficiency of advancing team-related businesses by the second team member can be improved.

In some embodiments, the method further includes: a second application team identification input by the user is received in the first application interface; a first binding request is sent according to the second application team identification, where the first binding request is configured to request the binding between the target first application team and the second application team indicated by the second application team identification input by the user; and based on a verification result on the first binding request, whether to bind the target first application team associated with the first application interface with the second application team indicated by the second application team identification input by the user is determined.

In some embodiments, the verification step of verifying the first binding request includes: whether an entity corresponding to the target first application team is the same with an entity corresponding to the second application team identification input by the user is verified; in response to being the same, a binding confirmation notification is sent to an administrative user corresponding to the second application team identification in the second application; and based on the confirmation operation of the binding confirmation notification, it is confirmed that the verification of the first binding request is successful.

In some application scenarios, there are some pain points associated with account usage. For example, firstly, the larger the scale of account matrix operation, the higher the risk of personnel turnover: when enterprise employees use personal accounts for operations, the enterprise cannot fully control the accounts and assets, and as a result, when the employees leave or change positions, the enterprise cannot inherit the account assets and data. Secondly, a plurality of accounts are required for operations, but there is a limited quota for enterprise accounts with operational capabilities, which hinders the enterprise from having sufficient operational capacity. Thirdly, data loss and difficulties in refined operations: the enterprise cannot fully grasp operational data of personal accounts and different primary enterprise accounts, which cannot satisfy the requirements for unified data aggregation and refined operations.

In some embodiments, the second application may belong to a public domain traffic application.

Herein, due to the characteristics of public domain traffic (allocating traffic based on content, and good content ensuring traffic acquisition without being influenced by original accumulation), the enterprise can better achieve cost-effective online customer acquisition through a matrix of public domain traffic accounts (lower cost compared to advertising campaigns, and easier customer acquisition compared to private domain applications such as instant messengers).

In some embodiments of this application, a new type of account belonging to the enterprise can be added in the second application, such as an enterprise employee account. By using the enterprise employee account, account assets can be inherited, thereby providing a foundation for the data open capability required for refined operations, and ensuring a higher quota of employee accounts.

In some embodiments, the second application team in the second application may also be referred to as an enterprise account. The enterprise account can authorize, based on online enterprise account tool capabilities, the enterprise employee account to have corresponding tool capabilities; and binding with the account of the first application team and auditing on enterprise employee account creating are performed.

In some embodiments, a new account type of enterprise employee accounts is required to be added: the first application team associated with the enterprise account can create N enterprise employee accounts with permissions belonging to the enterprise, the marking capability of the enterprise account is authorized to employee accounts of the enterprise employee accounts, and various types of data of the employee accounts will flow into the enterprise account.

In some application scenarios, an enterprise account operator who has the first application account bound with the enterprise account of the second application, may be a team member of the first application team, and may log in the enterprise account of the second application using the first application account (which may not be a unique login method for the enterprise account), and after a first application user resigns, the association relationship will be inherited by other users.

In some application scenarios, an employee account operator who has the first application account bound with the enterprise employee account of the second application can log in the enterprise employee account using the first application account (which may a unique login method for the employee account in some scenarios). After a real-name user of the enterprise employee account of the second application resigns, the binding relationship will be inherited by other users in the first application.

In some embodiments of this application, the first application may serve as an entry for creating, managing, and logging in. The enterprise employee account in the second application can be used after bound with the first application account.

Figure 3:
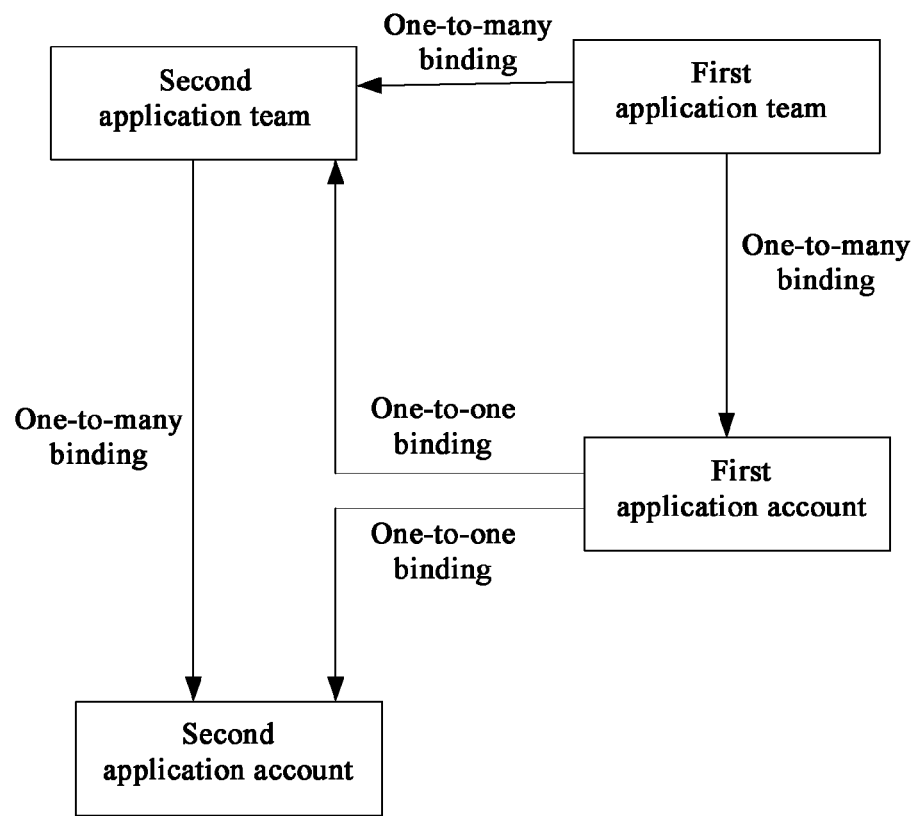
FIG. 3 is a schematic diagram of an application scenario of an interaction method according to the disclosure.

As an example, referring to FIG. 3, FIG. 3 illustrates a diagram of an adaptive account relationship for some embodiments of this application.

As shown in FIG. 3, a first application team may be bound with a second application team (which may be referred to as an enterprise account), and the binding relationship may be one-to-one or one-to-many. The first application team may be bound with a first application account. The second application team and a second application account (which may be referred to as an enterprise employee account) may be subjected to binding (the binding operation may be, for example, performed by a user with permissions for the operation from the first application team in a first application interface). The first application account may be bound with the second application account, and may also be bound with the second application team.

In some embodiments, referring to FIG. 4, FIG. 4 illustrates a process of binding a first application team with a second application team. The process of binding the first application team with the second application team may include: an administrator of the first application team clicks on "Add New Enterprise Account" in an "enterprise account management" module at an administration backend; and then, an enterprise account ID is input to search for an enterprise account (e.g., an exact search may be performed), and in the search process, there may be exceptions such as no search results, and the enterprise account not meeting binding requirements.

As shown in FIG. 4, enterprise account verifying parallel to a first application may be understood as a server or client of a second application. The enterprise account may be understood as the second enterprise team in the second application.

In some embodiments, if an input enterprise account entity is consistent with an entity of the first application team, it is possible to click to apply for binding.

In some embodiments, if the enterprise account entity is not consistent with the entity of the first team, a verification file upload entry can be displayed, and after a verification file is uploaded, the application for binding can be triggered.

In some embodiments, a second application account (may also be referred to as an enterprise employee account bound with the enterprise account) bound with the second application team may be created, re-bound, and canceled by the administrator of the first application team.

Figure 6:
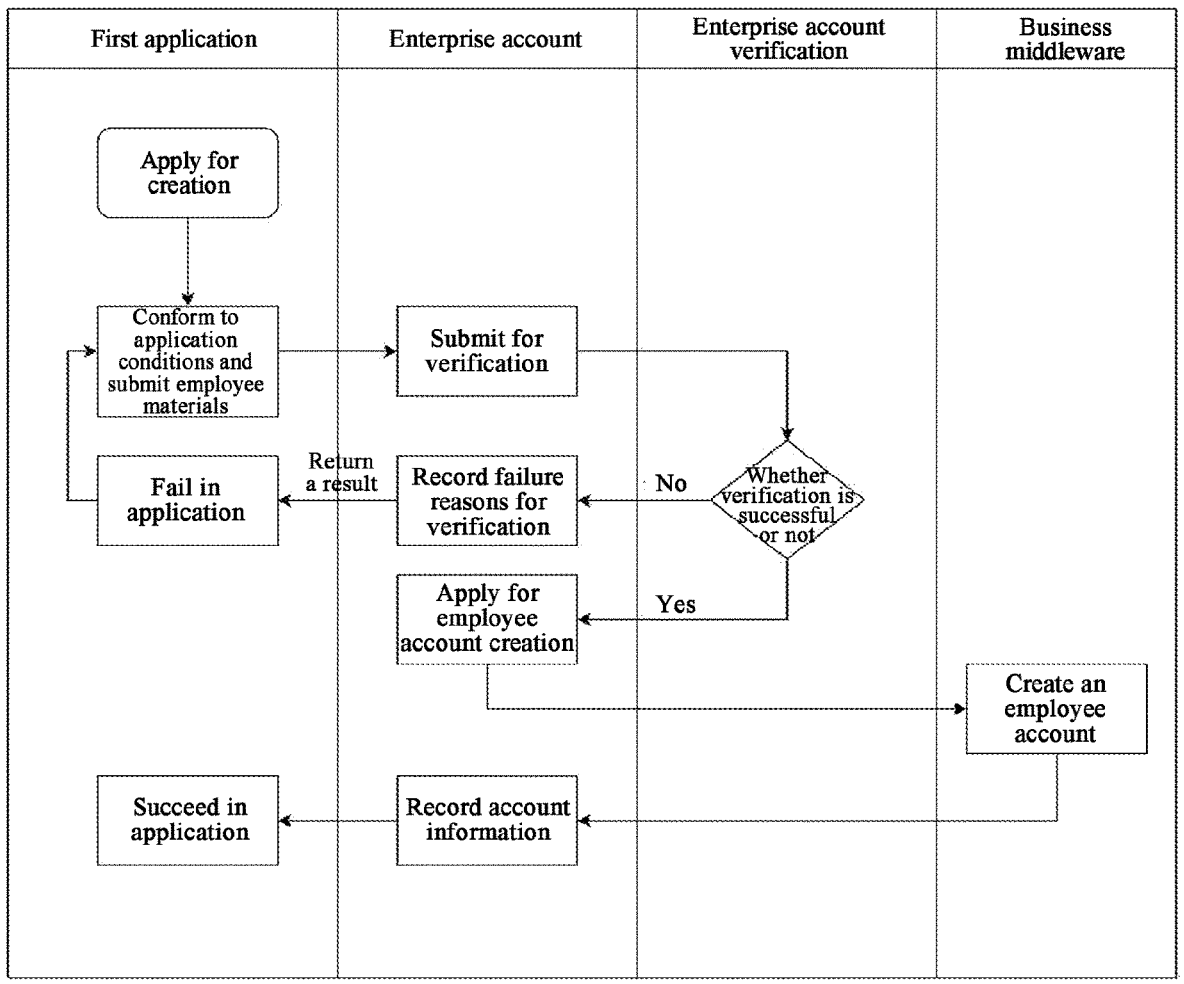
FIG. 6 is a schematic diagram of an application scenario of an interaction method according to the disclosure.

In some embodiments, referring to FIG. 6, FIG. 6 illustrates a schematic diagram of creating a second application account in a first application. As shown in FIG. 6, an enterprise account parallel to the first application may be understood as a server or client of a second application; and enterprise account audit parallel to the first application may be understood as an electronic device for auditing applications related to the binding of the enterprise account. Business middleware may be understood as an electronic device supporting creation of employee accounts.

An administrator of a first application team may create a plurality of second application accounts at a time. Each second application account may be bound with one or more team members of the first application team.

In some application scenarios, the administrator of the first application team may set a member of the first application as an operator (i.e., bound with the second application account) of the second application account. The operational permissions may be inherited among the members of the first application team. After the creation of the second application account, the default operator is a first application user selected during the creation, and there is no need for repeated operations.

Figure 7:
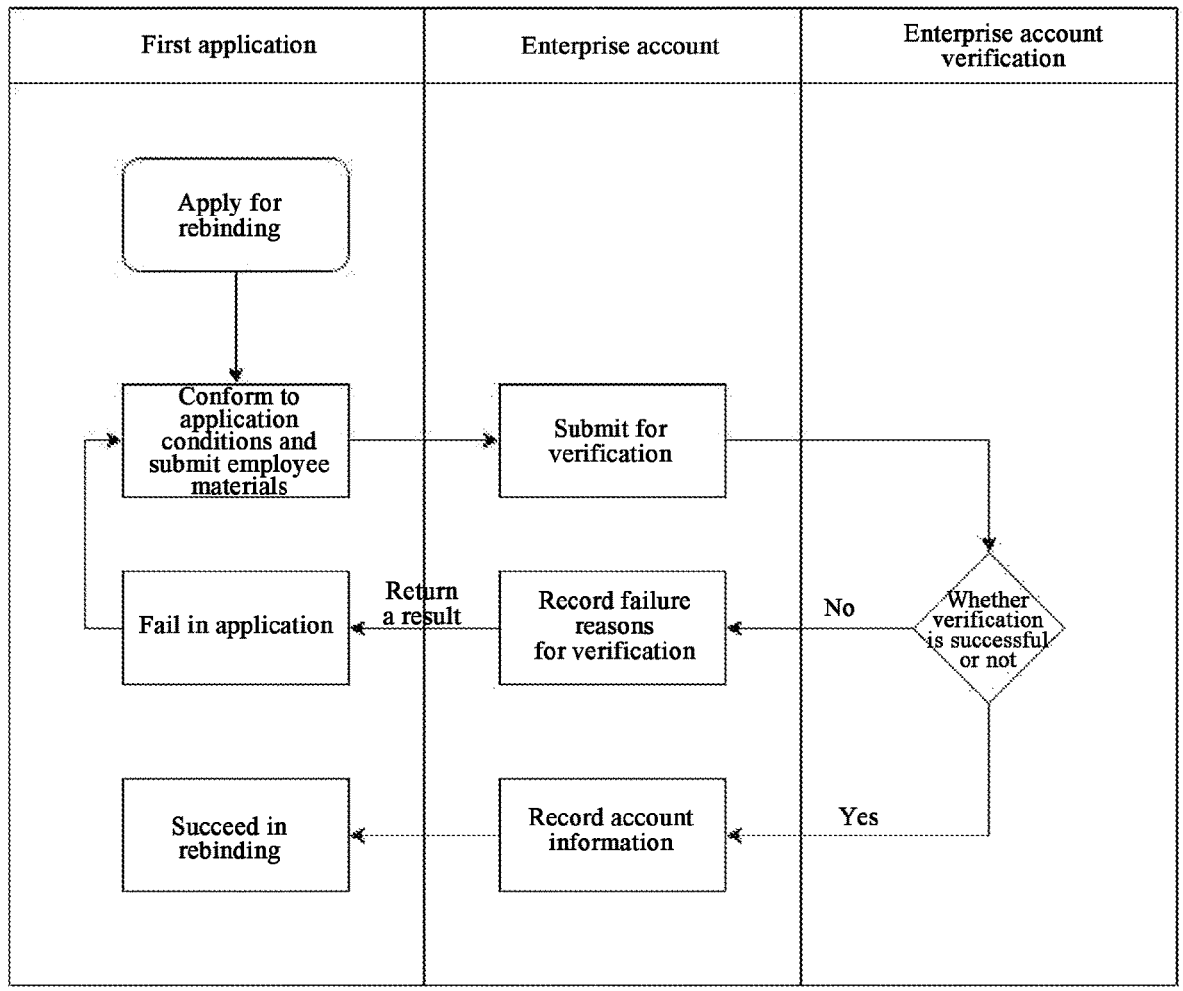
FIG. 7 is a schematic diagram of an application scenario of an interaction method according to the disclosure.

In some embodiments, referring to FIG. 7, FIG. 7 illustrates a schematic diagram of rebinding a first application account for a second application account in a first application. In some application scenarios, to change the binding, a "modify setting" control in the first application can be clicked to reselect an enterprise employee account operator (rebinding the first application account). After confirming the modification, the administrator of the first application team needs to complete short message service verification, etc. After the short message service verification is successfully completed, a robot is automatically triggered for a prompt that a first application user bound with a second application enterprise employee account signs an agreement, completes real-name authentication, and submits employment qualifications. The real-name authentication and employment qualifications are audited by a second application enterprise account. If the audit is successful, the operator can proceed to finalize the modification.

As shown in FIG. 7, an enterprise account parallel to the first application may be understood as a server or client of a second application; and enterprise account audit parallel to the first application may be understood as an electronic device for auditing applications related to the binding of the enterprise account. In response to applying for rebinding the first application, corresponding materials can be submitted to be audited by the enterprise account. Through the enterprise account audit, whether the audit is successful or not, corresponding results can be returned in either case.

In some embodiments, the administrator of the first application team may manage the second application account in the first application, such as performing viewing, a search, and account information filtering on a second application account list.

In some embodiments, referring to FIG. 5, FIG. 5 illustrates a schematic diagram of configuring capabilities of an enterprise account to employee accounts in a first application. The first application can obtain some authorized capabilities of the enterprise account, and capability identifications of these capabilities may be displayed as authorization items in the first application. A user selects some or all of the authorization items from the displayed authorization items and sends the authorization items to an enterprise account of a second application to apply for authorization. If the authorization application is approved, the first application can receive a notification of successful authorization, and employee accounts of the second application obtain permissions to use the corresponding authorized capabilities.

In some embodiments, an administrator of the first application team can modify permission configuration, remark adding, etc. for the enterprise employee accounts of the second application.

In some embodiments, a first application user may perform some operations based on the bound second application account, for example, account information settings: the first application account needs to log in the second application to modify basic information such as an account profile photo and name; and account content and user operations: the first application user may perform operations such as video recording and message reply in the second application.

Figure 8:
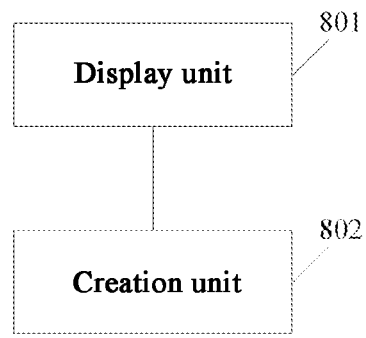
FIG. 8 is a structural schematic diagram of an embodiment of an interaction apparatus according to the disclosure.

Further referring to FIG. 8, as an implementation for the methods shown in the above figures, the disclosure provides an embodiment of an interaction apparatus. The apparatus embodiment corresponds to the method embodiment shown in FIG. 1, and the apparatus may be specifically applied to various electronic devices.

As shown in FIG. 8, the interaction apparatus in this embodiment includes a display unit 801 and a creation unit 802. The display unit is configured to display a first application interface, where the first application interface includes an interface of a first application. The creation unit is configured to create a second application account in the first application interface, where the second application account is configured to log in a second application.

In this embodiment, for the specific processing of the display unit 801 and the creation unit 802 of the interaction apparatus, and the brought technical effects, reference may be made to the relevant explanations of step 101 and step 102 in the corresponding embodiment shown in FIG. 1, and detailed descriptions are omitted herein.

In some embodiments, the apparatus is further configured to: bind the created second application account with a team member in a target first application team, where the target first application team is a team in a first application account system, and teams in the first application account system include team members.

In some embodiments, the step of binding the created second application account with a team member in a target first application team includes: a team member is selected from team members of the target first application team as a target team member; and the created second application account is bound with the target team member.

In some embodiments, the apparatus is further configured to unbind the team member in the target first application team from the second application account.

In some embodiments, the apparatus is further configured to: unbind the second application account from the bound team member in response to unbinding between the team member bound by the second application account and the target first application team; and display a prompt message, where the prompt message is used for indicating binding a new team member for the second application account.

In some embodiments, the apparatus is further configured to: perform management operations on the created second application account in the first application interface, where the management operations include at least one of the following: viewing, searching, and filtering.

In some embodiments, the created second application account is bound with a target second application team, where the target second application team is a team in a second application account system, and teams in the second application account system include team members.

In some embodiments, the step of creating a second application account in the first application interfaces includes: a target second application team bound with the target first application team is determined, where the target first application team is associated with the first application interface; and a second application account belonging to the target second application team is created in the first application interface.

In some embodiments, before determining a target second application team bound with the target first application team, the apparatus is further configured to: receive a second application team identification input by a user in the first application interface; send a first binding request according to the second application team identification, where the first binding request is used for requesting the binding between the target first application team and the second application team indicated by the second application team identification input by the user; and determine, based on a verification result on the first binding request, whether to bind the target first application team associated with the first application interface with the second application team indicated by the second application team identification input by the user.

In some embodiments, the verification step of verifying the first binding request includes: whether an entity corresponding to the target first application team is the same with an entity corresponding to the second application team identification input by the user is verified; in response to being same, a binding confirmation notification is sent to an administrative user corresponding to the second application team identification in the second application; and based on the confirmation operation of the binding confirmation notification, it is confirmed that the verification of the first binding request is successful.

In some embodiments, before the step of determining the target second application team bound with the target first application team, the apparatus is further configured to: receive a first application team identification input by a user in a second application interface; send a second binding request according to the first application team identification, where the second binding request is configured to request the binding between the target second application team and a first application team indicated by the first application team identification input by the user; and determine, based on a verification result on the second binding request, whether to bind the target second application team associated with the second application interface with the first application team indicated by the first application team identification input by the user.

In some embodiments, the apparatus is further configured to: display a login entry for the second application in the first application in response to a second application account is bound with a first application account logging in the first application currently; and display a second application interface.

Figure 9:
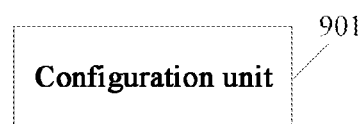
FIG. 9 is a structural schematic diagram of an embodiment of another interaction apparatus according to the disclosure.

Further referring to FIG. 9, as an implementation for the methods shown in the above figures, the disclosure provides an embodiment of an interaction apparatus. The apparatus embodiment corresponds to the method embodiment shown in FIG. 1, and the apparatus may be specifically applied to various electronic devices based on using the second application account at the login entry that bound with the first application account currently logged.

As shown in the FIG. 9, the interaction apparatus in this embodiment includes: a configuration unit 901. The configuration unit is configured to configure permissions of a second team member of a second application team in a first application interface, where a first application team associated with the first application interface is bound with the second application team.

Figure 2:
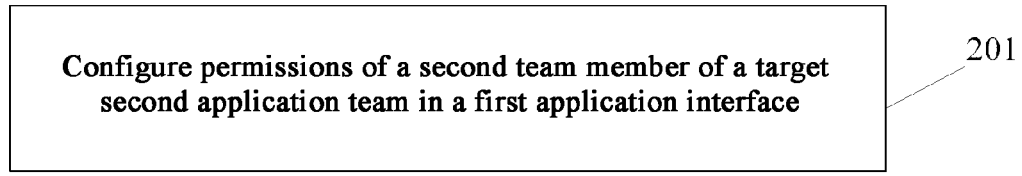
FIG. 2 is a flowchart of an embodiment of another interaction method according to the disclosure.

In this embodiment, for the specific processing of the configuration unit 901 of the interaction apparatus, and the brought technical effects, reference may be made to the relevant explanations of step 201 in the corresponding embodiment shown in FIG. 2, and detailed descriptions are omitted herein.

In some embodiments, the step of configuring permissions of a second team member of a second application team in a first application interface includes: a preset first permission identification of the second application team is displayed in the first application interface, and the preset first permission identification indicates team permissions possessed by the second team; according to the selection operation on the displayed preset first permission identification, a first authorization request is sent according to the selected first permission identification; and based on an authorization result for the first authorization request, a preset first permission possessed by the second team member is determined.

In some embodiments, the apparatus is further configured to: receive a second application team identification input by a user in the first application interface; send a first binding request according to the second application team identification, where the first binding request is configured to request the binding between a target first application team and a second application team indicated by the second application team identification input by the user; and determine, based on a verification result on the first binding request, whether to bind the target first application team associated with the first application interface with the second application team indicated by the second application team identification input by the user.

In some embodiments, the verification step of verifying the first binding request includes: whether an entity corresponding to the target first application team is the same with an entity corresponding to the second application team identification input by the user is verified; in response to being same, a binding confirmation notification is sent to an administrative user corresponding to the second application team identification in the second application; and based on the confirmation operation of the binding confirmation notification, it is confirmed that the verification of the first binding request is successful.

Figure 10:
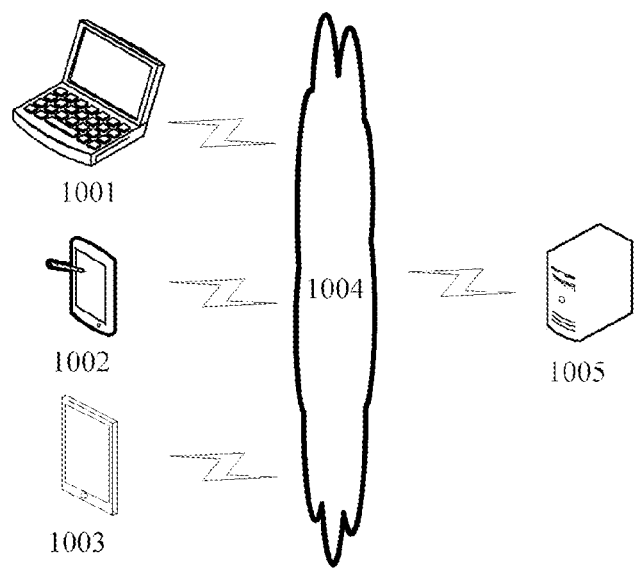
FIG. 10 is an exemplary system architecture to which an interaction method in an embodiment of the disclosure can be applied.

Referring to FIG. 10, FIG. 10 illustrates an exemplary system architecture to which an interaction method in an embodiment of the disclosure can be applied.

As shown in FIG. 10, the system architecture may include terminal devices 1001, 1002, and 1003, a network 1004, and a server 1005. The network 1004 is a medium configured to provide a communication link between the terminal devices 1001, 1002, and 1003 and the server 1005. The network 1004 may have various types of connections, such as wired and wireless communication links, or fiber optic cables, etc.

The terminal devices 1001, 1002, and 1003 may interact with the server 1005 through the network 1004 to receive or send messages, etc. The terminal devices 1001, 1002, and 1003 may be equipped with various client applications, such as web browser applications, search applications, and news information applications. The client applications on the terminal devices 1001, 1002, and 1003 can receive user instructions and complete corresponding functions based on the user instructions, such as adding corresponding information to messages based on the user instructions.

The terminal devices 1001, 1002, and 1003 may be hardware or software. When the terminal devices 1001, 1002, and 1003 are hardware, the terminal devices 1001, 1002, and 1003 may be various electronic devices with display screens that support web browsing, which include but not limited to smart phones, tablets, e-readers, moving picture experts group audio layer III (MP3) players, moving picture experts group audio layer IV (MP4 players), laptops, desktop computers, etc. When the terminal devices 1001, 1002, and 1003 are software, the terminal devices 1001, 1002, 1003 can be installed in the above listed electronic devices, may be implemented as a plurality of software or software modules (e.g., software or software modules configured to provide distributed services), and may also be implemented as a single software or software module, which is not specifically limited herein.

The server 1005 may be a server that provides various services, such as receiving information obtaining requests sent by the terminal devices 1001, 1002, and 1003, acquiring, according to the information obtaining requests, display information corresponding to the information obtaining requests through various methods, and sending relevant data of the display information to the terminal devices 1001, 1002, and 1003.

It should be noted that the interaction method provided in this embodiment of the disclosure may be executed by the terminal device. Correspondingly, the interaction apparatus may be set in the terminal devices 1001, 1002, and 1003. In addition, the interaction method provided in this embodiment of the disclosure may also be executed by the server 1005. Correspondingly, the interaction apparatus may be set in the server 1005.

It should be understood that the number of the terminal devices, networks and servers in FIG. 10 is for an illustrative purpose merely. According to implementation needs, there may be any number of terminal devices, networks and servers.

Figure 11:
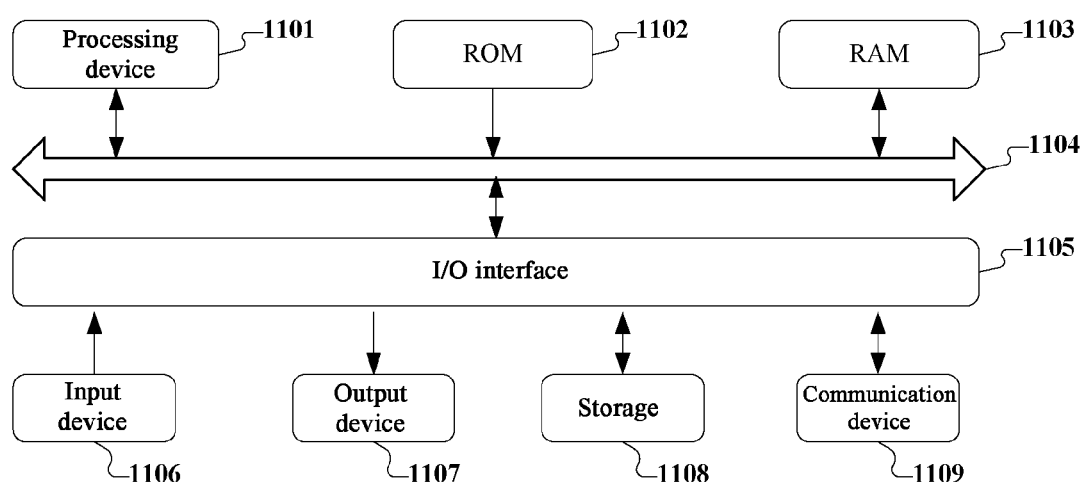
FIG. 11 is a schematic diagram of basic structure an electronic device according to an embodiment of the disclosure.

Referring to FIG. 11 as below, FIG. 11 illustrates a structural schematic diagram of an electronic device (e.g., a terminal device or a server in FIG. 10) applicable to implementing embodiments of the disclosure. The terminal device in this embodiment of the disclosure may include but not limited to mobile terminals such as a mobile phone, a notebook computer, a digital radio receiver, a personal digital assistant (PDA), a portable Android device (PAD), a portable media player (PMP), a vehicle-mounted terminal (e.g., a vehicle-mounted navigation terminal), and fixed terminals such as a digital TV and a desk computer. The electronic device shown in FIG. 11 is merely an example, which should not impose any limitations on functions and application ranges of this embodiment of the disclosure.

As shown in FIG. 11, the electronic device may include a processing device (e.g., a central processing unit and a graphics processing unit) 1101, which may perform various appropriate actions and processing according to programs stored on a read only memory (ROM) 1102 or loaded from a storage 1108 into a random access memory (RAM) 1103. The RAM 1103 further stores various programs and data required for the operation of the electronic device 1100. The processing device 1101, the ROM 1102, and the RAM 1103 are connected to one another through a bus 1104. An input/output (I/O) interface 1105 is also connected to the bus 1104.

Typically, the following apparatuses may be connected to the I/O interface 1105: an input device 1106, such as a touchscreen, a touchpad, a keyboard, a mouse, a camera, a microphone, an accelerometer, and a gyroscope; an output device 11011, such as a liquid crystal display (LCD), a speaker, and a vibrator; the storage 1108, such as a magnetic tape and a hard drive; and a communication device 1109. The communication device 1109 may allow the electronic device to be in wireless or wired communication with other devices for data exchange. Although FIG. 11 illustrates the electronic device with various apparatuses, it should be understood that it is not necessary to implement or have all the shown apparatuses. Alternatively, more or fewer apparatuses may be implemented or provided.

Particularly, the foregoing process described with reference to the flowchart according to the embodiments of the disclosure may be implemented as a computer software program. For example, an embodiment of the disclosure includes a computer program product including a computer program stored on a non-transitory computer-readable medium. The computer program includes program code for executing the method shown in the flowchart. In this embodiment, the computer program may be downloaded and installed from the network by the communication device 1109, or installed from the storage 1108, or installed from the ROM 1102. The computer program, when executed by the processing device 1101, performs the above functions limited in the method in this embodiment of the disclosure.

It should be noted that the computer-readable medium in the disclosure may be a computer-readable signal medium, or a computer-readable storage medium, or any combination thereof. For example, the computer-readable storage medium may include but not limited to: electrical, magnetic, optical, electromagnetic, infrared or semiconductor systems, apparatuses or devices, or any combination thereof. More specific examples of the computer-readable storage medium may include but not limited to: an electrical connection with one or more wires, a portable computer disk, a hard drive, a random access memory (RAM), a read only memory (ROM), an erasable programmable read only memory (EPROM or a flash memory), fiber optics, a portable compact disc read only memory (CD-ROM), a light storage device, a magnetic storage device, or any proper combination of the above. In the disclosure, the computer-readable storage medium may be any tangible medium including or storing a program, and the program may be used by an instruction execution system, apparatus or device, or used in conjunction with the instruction execution system, apparatus or device. However, in the disclosure, the computer-readable signal medium may include data signals propagated in a baseband or propagated as a part of a carrier wave, which carry computer-readable program code. The propagated data signals may have a plurality of forms, and include but not limited to electromagnetic signals, optical signals or any proper combination of the above. The computer-readable signal medium may be any computer-readable medium other than the computer-readable storage medium. The computer-readable signal medium may send, propagate or transmit the program used by the instruction execution system, apparatus or device, or used in conjunction with the instruction execution system, apparatus or device. The program code included in the computer-readable medium may be transmitted by any proper medium including but not limited to a wire, an optical cable, radio frequency (RF), etc., or any proper combination of the above.

In some implementations, the client and the server can communicate using any currently known or future-developed network protocols such as a hypertext transfer protocol (HTTP), and may also be can be in communication connection with digital data in any form or medium (e.g., a communication network). For example, the communication network includes a local area network ("LAN"), a wide area network ("WAN"), Internet (e.g., the Internet), a peer-to-peer network (e.g., an ad hoc peer-to-peer network), and any currently known or future-developed networks.

The computer-readable medium may be included in the electronic device; and may separately exist without being assembled in the electronic device.

The computer-readable medium carries one or more programs. The one or more programs, when executed by the electronic device, enable the electronic device to: display a first application interface, where the first application interface includes an interface of a first application; and create a second application account in the first application interface, where the second application account is configured to log in a second application.

In some embodiments, the electronic device is further configured to: bind the created second application account with a team member in a target first application team, where the target first application team is a team in a first application account system, and teams in the first application account system include team members.

In some embodiments, the step of binding the created second application account with a team member in a target first application team includes: a team member is selected from team members of the target first application team as a target team member; and the created second application account is bound with the target team member.

In some embodiments, the electronic device is further configured to: unbind the team member in the target first application team from the second application account.

In some embodiments, the electronic device is further configured to: unbind the second application account from the bound team member in response to unbinding between the team member bound by the second application account and the target first application team; and display a prompt message, where the prompt message is used for indicating binding a new team member for the second application account.

In some embodiments, the electronic device is further configured to: perform management operations on the created second application account in the first application interface, where the management operations include at least one of the following: viewing, searching, and filtering.

In some embodiments, the created second application account is bound with a target second application team, where the target second application team is a team in a second application account system, and teams in the second application account system include team members.

In some embodiments, the step of creating a second application account in the first application interfaces includes: a target second application team bound with the target first application team is determined, where the target first application team is associated with the first application interface; and a second application account belonging to the target second application team is created in the first application interface.

In some embodiments, before the step of determining a target second application team bound with the target first application team, the electronic device is further configured to: receive a second application team identification input by a user in the first application interface; send a first binding request according to the second application team identification, where the first binding request is configured to request the binding between the target first application team and the second application team indicated by the second application team identification input by the user; and determine, based on a verification result on the first binding request, whether to bind the target first application team associated with the first application interface with the second application team indicated by the second application team identification input by the user.

In some embodiments, the verification step of verifying the first binding request includes: whether an entity corresponding to the target first application team is the same with an entity corresponding to the second application team identification input by the user is verified; in response to being same, a binding confirmation notification is sent to an administrative user corresponding to the second application team identification in the second application; and based on the confirmation operation of the binding confirmation notification, it is confirmed that the verification of the first binding request is successful.

In some embodiments, before the step of determining a target second application team bound with the target first application team, the electronic device is further configured to: receive a first application team identification input by a user in a second application interface; send a second binding request according to the first application team identification, where the second binding request is configured to request the binding between the target second application team and a first application team indicated by the first application team identification input by the user; and determine, based on a verification result on the second binding request, whether to bind the target second application team associated with the second application interface with the first application team indicated by the first application team identification input by the user.

In some embodiments, the electronic device is further configured to: display a login entry for the second application in the first application in response to a second application account is bound with a first application account logging in the first application currently; and display a second application interface based on using the second application account at the login entry that bound with the first application account currently logged.

The computer-readable medium carries one or more programs. The one or more programs, when executed by the electronic device, enable the electronic device to: configure permissions of a second team member of the second application team in the first application interface, where the first application team associated with the first application interface is bound with the second application team.

In some embodiments, the step of configuring permissions of a second team member of the second application team in the first application interface includes: a preset first permission identification of the second application team is displayed in the first application interface, and the preset first permission identification indicates team permissions possessed by the second team; according to the selection operation on the displayed preset first permission identification, a first authorization request is sent according to the selected first permission identification; and based on an authorization result for the first authorization request, a preset first permission possessed by the second team member is determined.

In some embodiments, the electronic device is further configured to: receive a second application team identification input by the user in the first application interface; send a first binding request according to the second application team identification, where the first binding request is configured to request the binding between a target first application team and a second application team indicated by the second application team identification input by the user; and determine, based on a verification result on the first binding request, whether to bind the target first application team associated with the first application interface with the second application team indicated by the second application team identification input by the user.

In some embodiments, the verification step of verifying the first binding request includes: whether an entity corresponding to the target first application team is the same with an entity corresponding to the second application team identification input by the user is verified; in response to being same, a binding confirmation notification is sent to an administrative user corresponding to the second application team identification in the second application; and based on the confirmation operation of the binding confirmation notification, it is confirmed that the verification of the first binding request is successful.

The computer program code for executing the operations of the disclosure may be written in one or more programming languages or a combination thereof. The programming languages include but not limited to object-oriented programming languages such as Java, Smalltalk, C++, as well as conventional procedural programming languages such as "C" or similar programming languages. The program code may be executed entirely or partially on a user computer, executed as a standalone software package, executed partially on the user computer and partially on a remote computer, or entirely executed on the remote computer or server. In the case of involving the remote computer, the remote computer may be connected to the user computer via any type of network, including a local area network (LAN) or wide area network (WAN), or may be connected to an external computer (e.g., utilizing an Internet service provider for Internet connectivity).

The flowcharts and block diagrams in the accompanying drawings illustrate system architectures, functions, and operations possibly implemented by the system, method and computer program product according to the various embodiments of the disclosure. In this regard, each block in the flowcharts or block diagrams may represent a module, a program segment, or a portion of the code, and the module, program segment, or portion of the code includes one or more executable instructions for implementing specified logical functions. It should be noted that in some alternative implementations, functions marked in the blocks may also occur in an order different from that marked in the accompanying drawings. For example, two consecutively-represented blocks may actually be executed in parallel basically, but sometimes may also be executed in a reverse order, which depends on involved functions. It should be further noted that each block in the block diagrams and/or flowcharts as well as a combination of the blocks in the block diagrams and/or flowcharts may be implemented by using a dedicated hardware-based system that executes specified functions or operations, or using a combination of special hardware and computer instructions.

The units described in the embodiments of the disclosure may be implemented through software or hardware. The name of the unit does not limit the unit in certain cases. For example, a creation unit may also be described as a "unit for creating a second application account."

The functions described above in this specification may be at least partially executed by one or more hardware logic components. For example, exemplary hardware logic components that can be used include but not limited to a field-programmable gate array (FPGA), an application specific integrated circuit (ASIC), application specific standard parts (ASSPs), a system on chip (SOC), a complex programmable logic device (CPLD), etc.

In the context of the disclosure, a machine-readable medium may be a tangible medium that may contain or store a program, and the program may be used by an instruction execution system, apparatus or device, or used in conjunction with the instruction execution system, apparatus or device. The machine-readable medium may be a machine-readable signal medium or a machine-readable storage medium. The machine-readable medium may include but not limited to: electronic, magnetic, optical, electromagnetic, infrared, or semiconductor systems, apparatuses or devices, or any proper combination of the above. More specific examples of the machine-readable storage medium may include: an electrical connection based on one or more wires, a portable computer disk, a hard drive, a random access memory (RAM), a read only memory (ROM), an erasable programmable read only memory (EPROM or a flash memory), fiber optics, a portable compact disc read only memory (CD-ROM), a light storage device, a magnetic storage device, or any proper combination of the above.

The above descriptions are merely preferred embodiments of the disclosure and explanations of the applied technical principles. Those skilled in the art should understand that the scope of open in the disclosure is not limited to the technical solutions formed by specific combinations of the above technical features, and also covers other technical solutions formed by arbitrary combinations of the above technical features or equivalent features without departing from the concept of the disclosure, such as a technical solution formed by replacing the above features with the technical features with similar functions disclosed (but not limited to) in the disclosure.

Further, although the operations are described in a particular order, it should not be understood as requiring these operations to be performed in the shown particular order or in a sequential order. In certain environments, multitasking and parallel processing may be advantageous. Similarly, although several specific implementation details are included in the above discussion, these specific implementation details should not be interpreted as limitations on the scope of the disclosure. Certain features described in the context of separate embodiments may also be implemented in combination in a single embodiment. Conversely, various features described in the context of a single embodiment may also be implemented separately or in any suitable sub-combination in a plurality of embodiments.

Although the language specific to structural features and/or method logical actions is adopted to describe this subject, but it should be understood that the subject limited in the appended claims is not necessarily limited to the specific features or actions described above. On the contrary, the specific features and actions described above are merely examples for implementing the claims.

We claim:

1. An interaction method, comprising:

displaying by a first application, a first application interface of a target first application team, wherein the first application interface comprises an interface of a first application, the target first application team is a team in a first application account system;

in response to a user operation for creating a second application account in a second application, receiving, by the first application, a second application team identification input by a user in the first application interface;

determining, by the first application, whether the user has an operation permission to initiate creation of the second application account;

in response to the user having the operation permission, generating, by the first application, a first binding request comprising the second application team identification, and transmitting the first binding request from the first application to the second application, wherein the first binding request is configured to request the binding between the target first application team and a second application team indicated by the second application team identification input by the user;

receiving, by the first application, a verification result from the second application system, wherein the verification result is determined by the second application based on whether an entity corresponding to the target first application team matches an entity corresponding to a second application team identifier input by the user;

in response to the verification result indicating that the target first application team is eligible to be bound to the second application team indicated by the second application team identifier, creating, by the first application, the second application account in the first application interface, wherein the second application account is configured to log in the second application, a target second application team is a team in a second application account system, a team in the second application account system comprises team members, and the target second application team is bound with the target first application team, so that the second application account is automatically bound to the target second application team; and receiving, by the first application system, a selection of a team member of the target first application team for binding with the created second application account, and binding the created second application account with the team member in the target first application team, wherein a team in the first application account system comprises team members.

2. The method according to claim 1, wherein the binding the created second application account with a team member of a target first application team comprises:
selecting a team member from team members of the target first application team as a target team member; and
binding the created second application account with the target team member.

3. The method according to claim 1, wherein the method further comprises:
unbinding the team member in the target first application team from the second application account.

4. The method according to claim 1, wherein the method further comprises:
unbinding the second application account from the bound team member in response to unbinding between the team member bound by the second application account and the target first application team; and
displaying a prompt message, wherein the prompt message is configured to prompt binding a new team member for the second application account.

5. The method according to claim 1, wherein the method further comprises:
performing management operations on the created second application account in the first application interface, wherein the management operations comprise at least one of: viewing, searching, and filtering.

6. The method according to claim 1, wherein the created second application account is bound with a target second application team, wherein the target second application team is a team in a second application account system, and teams in the second application account system comprise team members.

7. The method according to claim 1, wherein the creating a second application account in the first application interface, the second application account being configured to log in a second application, comprises:
determining a target second application team bound with a target first application team, wherein the target first application team is associated with the first application interface; and
creating the second application account belonging to the target second application team in the first application interface.

8. The method according to claim 7, wherein verification steps of verifying the first binding request comprises:
verifying whether an entity corresponding to the target first application team is the same with an entity corresponding to the second application team identification input by the user;
in response to being same, sending a binding confirmation notification to an administrative user corresponding to the second application team identification in the second application; and confirming, based on a confirmation operation of the binding confirmation notification, that the verification of the first binding request is successful.

9. The method according to claim 7, wherein before determining a target second application team bound with a target first application team, the method further comprises:
receiving a first application team identification input by a user in a second application interface;
sending a second binding request according to the first application team identification, wherein the second binding request is configured to request the binding between the target second application team and a first application team indicated by the first application team identification input by the user; and
determining, based on a verification result on the second binding request, whether to bind the target second application team associated with the second application interface with the first application team indicated by the first application team identification input by the user.

10. The method according to claim 1, wherein the method further comprises:
in response to a second application account is bound with a first application account logging in the first application currently, displaying a login entry for the second application in the first application; and
displaying a second application interface based on using the second application account at the login entry that bound with the first application account currently logged.

11. The method according to claim 1, further comprising:
in response to a request for configuring permissions of a second team member of the target second application team, configuring, by the electronic device, the permissions of the second team member of the target second application team in the first application interface, wherein the target first application team associated with the first application interface is bound with the target second application team, the target second application team is an enterprise account, and the second team member is an employee account;
wherein the second application account bound with the second application team is created, re-bound, and deregistered in the first application interface by an administrative user of the target first application team; and
wherein the administrative user of the target first application team performs management operations on the second application account in the first application interface, and the management operation comprises at least one of viewing, searching and filtering.

12. The method according to claim 11, wherein the configuring permissions of a second team member of a target second application team in a first application interface comprises:
displaying a preset first permission identification of the target second application team in the first application interface, the preset first permission identification indicating team permissions possessed by second application teams;
sending, according to a selection operation on the displayed preset first permission identification, a first authorization request according to the selected first permission identification; and
determining, based on an authorization result for the first authorization request, a preset first permission possessed by the second team member.

13. The method according to claim 11, wherein the method further comprises:
- receiving a second application team identification input by a user in the first application interface;
- sending a first binding request according to the second application team identification, wherein the first binding request is configured to request the binding between the target first application team and a second application team indicated by the second application team identification input by the user; and
- determining, based on a verification result on the first binding request, whether to bind the target first application team associated with the first application interface with the second application team indicated by the second application team identification input by the user.

14. The method according to claim 13, wherein steps of verifying the first binding request comprises:
- verifying whether an entity corresponding to the target first application team is the same with an entity corresponding to the second application team identification input by the user;
- in response to being same, sending a binding confirmation notification to an administrative user corresponding to the second application team identification in the second application; and
- confirming, based on a confirmation operation of the binding confirmation notification, that the verification of the first binding request is successful.

15. An electronic device, comprising:
one or more processors; and
a storage, configured to store one or more programs,
when the one or more programs are executed by the one or more processors, the one or more processors are configured to:
- display, by a first application, a first application interface of a target first application team, wherein the first application interface comprises an interface of a first application, the target first application team is a team in a first application account system;
- in response to a user operation for creating a second application account in a second application, receive, by the first application, a second application team identification input by a user in the first application interface;
- determine, by the first application, whether the user has an operation permission to initiate creation of the second application account;
- in response to the user having the operation permission, generate, by the first application, a first binding request comprising the second application team identification, and transmit the first binding request from the first application to the second application, wherein the first binding request is configured to request the binding between the target first application team and a second application team indicated by the second application team identification input by the user;
- receive, by the first application, a verification result from the second application system, wherein the verification result is determined by the second application based on whether an entity corresponding to the target first application team matches an entity corresponding to a second application team identifier input by the user;
- in response to the verification result indicating that the target first application team is eligible to be bound to the second application team indicated by the second application team identifier, create, by the first application, the second application account in the first application interface, wherein the second application account is configured to log in the second application, a target second application team is a team in a second application account system, a team in the second application account system comprise team members, and the target second application team is bound with the target first application team, so that the second application account is automatically bound to the target second application team; and
- receive, by the first application system, a selection of a team member of the target first application team for binding with the created second application account, and bind the created second application account with the team member in the target first application team, wherein a team in the first application account system comprises team members.

16. The electronic device according to claim 15, wherein the binding the created second application account with a team member of a target first application team comprises:
- selecting a team member from team members of the target first application team as a target team member; and
- binding the created second application account with the target team member.

17. The electronic device according to claim 15, the one or more processors are further configured to:
- unbind the team member in the target first application team from the second application account.

18. The method according to claim 1, wherein the method further comprises:
- in response to a request to create a plurality of second application accounts, performing, in the first application interface, batched creation of second application accounts.

19. The electronic device according to claim 15, the one or more processors are further configured to:
- in response to a request to create a plurality of second application accounts, performing, in the first application interface, batched creation of second application accounts.

* * * * *